United States Patent [19]

Okuda et al.

[11] 4,103,528
[45] Aug. 1, 1978

[54] APPARATUS FOR RELEASING DRIVE ASSEMBLY FROM DRIVEN SHAFT AND CONNECTING SAME THERETO

[75] Inventors: Hiroji Okuda, Kitakatsuragigun; Masaaki Washida, Muroran; Hisashi Ide, Ikomagun, all of Japan

[73] Assignees: Koyo Seiko Company, Limited; Nippon Steel Corporation, both of Tokyo, Japan

[21] Appl. No.: 820,124

[22] Filed: Jul. 28, 1977

[51] Int. Cl.² .............................................. B21B 35/14
[52] U.S. Cl. ...................................................... 72/238
[58] Field of Search .................................. 72/238, 239

[56] References Cited

U.S. PATENT DOCUMENTS

| | | | |
|---|---|---|---|
| 2,815,690 | 12/1957 | O'Malley et al. | 72/239 |
| 3,559,441 | 2/1971 | Lemper et al. | 72/239 |

FOREIGN PATENT DOCUMENTS 2,602,655 5/1976 Fed. Rep. of Germany ............. 72/239

*Primary Examiner*—Milton S. Mehr

*Attorney, Agent, or Firm*—Mason, Fenwick & Lawrence

[57] ABSTRACT

Two drive assemblies disposed one above the other and each including a telescopic spindle, a universal joint and a coupling member are released from and connected to similarly disposed driven shafts respectively by an apparatus comprising a frame slidable toward or away from the driven shafts in parallel to the extensions of the axes of the driven shafts and upper and lower holding means vertically slidably supported by posts on the front end of the frame and each adapted to hold the opposite sides of the coupling member to support the coupling member in its horizontal position in alignment with the corresponding driven shaft when the coupling is to be released from or connected to the driven shaft. For the replacement of the driven shafts, the upper and lower coupling members as supported in their horizontal position by the holding means are vertically moved in a given ratio relative to each other and thereby brought into alignment with new driven shafts. The posts supporting the holding means and the frame supporting the holding means withstand the reaction resulting from the holding of the coupling members by the holding means.

16 Claims, 10 Drawing Figures

APPARATUS FOR RELEASING DRIVE ASSEMBLY FROM DRIVEN SHAFT AND CONNECTING SAME THERETO

BACKGROUND OF THE INVENTION

The present invention relates to an apparatus for releasing a drive assembly from a driven member and connecting the same thereto, more particularly to an apparatus by which the coupling member of a drive assembly including a universal joint, ball joint, gear coupling or the like can be released from and connected to a driven member and which is especially useful for drive assemblies interconnecting the rolls of rolling mills to drive means.

Generally, working rolls of rolling mills are replaced with the use of a crane by which the roll is moved as suspended therefrom, or with the use of hydraulic means. In the former method, a C-shaped hook or porter bar is usually used. In recent years, a pair of upper and lower rolls are released from or connected to the driven shafts at the same time with the use of a double-eye C-shaped hook or porter bar in order to shorten the work time.

When the pair of upper and lower working rolls are handled at the same time, the coupling members of the upper and lower universal joints for the necks of the upper and lower rolls must be held at the same center-to-center spacing as the upper and lower rolls, whereas it is extremely difficult to maintain the upper and lower rolls at definite levels especially when a crane is used.

It is further noted that torque transmission between the coupling and the roll neck is effected through a joint including a key or a portion of oval rectangular cross section fitting in a bore of corresponding shape. If there is a relative angular displacement between the coupling and the roll to be joined thereto, it is extremely difficult to eliminate such angular displacement to fit them together, because the roll neck is supported by a C-hook or porter bar and is not rotatable.

Because of these difficulties, the insertion of the roll neck into the coupling gives a high impact load to the drive assembly, permitting the roll neck to strike the coupling when the corresponding portions to be joined together differ greatly in the above-mentioned spacing or involve a great angular displacement.

Japanese patent application published as Publication No. 4767/1966 proposes a method of releasing a roll of rolling mill from a spindle by moving the spindle or its coupling toward the drive means from the roll. According to the proposed method, a gear-type coupling interconnecting the roll neck to the spindle has a boss (intermediate shaft) joined to the spindle and supported by a bearing at all times. The bearing is rotatably and vertically slidably mounted on an upright post on a frame which is equipped with a support for supporting the outer tube of the coupling. The outer tube on the support is vertically shiftable for adjustment, and the spindle is rotatable. The other boss of the coupling joined to the roll neck is releasable from and connectible to the roll neck by the axial movement of the frame.

Generally with rolling mills, the roll neck and the coupling, although fitted together with a loose fit, are designed to involve the least possible backlash, so that very high pressure usually acts between the outer surface of the roll neck and the inner surface of the coupling as if in a press fit. Accordingly, with the rolling mill disclosed in the foregoing publication, the holding force acting between the outer surface of the roll neck and the inner surface of the boss of the coupling joined to the roll neck is sometimes greater than the frictional force between the outer tube of the coupling and the support when the frame is axially moved to release the coupling from the roll neck, because the outer tube of the coupling merely bears on the support positioned thereunder. Consequently, the support idly slides on the outer tube of the coupling by a distance corresponding to the axial backlash inherently involved in the coupling, frequently failing to smoothly remove the coupling from the roll neck for the replacement of the roll.

Further since the roll neck fits in the boss of the coupling joined thereto as by a press fit, the above-mentioned axial movement of the frame first expands spring provided in the coupling by a length corresponding to the axial backlash of the coupling, axially moving only the other boss (intermediate shaft) joined to the spindle. Subsequently, the boss of the coupling joined to the roll neck is separated therefrom, abruptly moving toward the spindle simultaneously with the contraction of the spring. This produces an impact within the coupling, possibly causing damage to the coupling.

Additionally, since the outer tube of the coupling is supported by the support at two points, there is difficulty in supporting the coupling in balance, with the result that the boss to be joined to the neck of a new roll is liable to be positioned at a lower level than is desired. If the coupling is thus out of alignment with the roll, the boss will strike the roll neck, failing to fit around the neck of the roll to be substituted. It is further noted that the bearing for supporting the boss of the gear-type coupling joined to the spindle serves as a so-called carrier, so that it rotates with that boss in contact therewith at all times, thus entailing a great power transmission loss.

With rolling mills, the upper and lower working rolls are replaced with the upper roll placed on the lower roll in intimate contact therewith. When new upper and lower working rolls are intalled on the lower backup roll, the center of the new lower working roll has been shifted from the center of the old lower working roll by an amount corresponding to ½ the difference in diameter between the new and old working rolls. The distance between the centers of the new upper and lower working rolls is greater than like distance between the old upper and lower working rolls by the sum of the difference in radius between the new and old upper working rolls and the difference in radius between the new and old lower working rolls. Generally, the upper and lower working rolls used in a pair are approximately equal in diameter. Based on the top surface of the lower backup roll, therefore, the center of the new lower working roll mounted in place has been vertically shifted from that of the old lower working roll by ½ the difference in diameter between the new and old lower working rolls. Similarly, the center of the new upper working roll has been vertically shifted from that of the old upper working roll by 3/2 times the difference in diameter between the new and old upper working rolls. The replacement of the working rolls involves such a definite relationship. However conventional roll replacing apparatus are not provided with means for aligning new upper and lower working rolls with corresponding couplings respectively in accordance with this relationship and therefore involve great difficulties in replacing the working rolls.

SUMMARY OF THE INVENTION

An object of this invention is to provide an apparatus by which a coupling can be released from and connected to a working roll of rolling mills with ease and within a greatly reduced period of time for the replacement of the roll.

Another object of this invention is to ensure the above releasing and connection procedures smoothly free of any objections such as impact due to collision between the coupling and the roll neck.

Still another object of this invention is to provide an apparatus of the type described for the replacement of two working rolls disposed one above the other and coupled to similarly disposed two drive assemblies, the apparatus being easily capable of aligning the couplings of the drive assemblies with the roll necks of new upper and lower working rolls to be substituted for the old rolls in conformity with the differences in diameter between the old and new rolls.

To fulfil the above objects, the apparatus of this invention is adapted for use with two drive assemblies disposed one above the other and each including a telescopic spindle and a coupling connected to the spindle by a universal joint. The apparatus is characterized by holding means having holders for holding the opposite sides of each coupling to support the coupling in its horizontal position and to bring the coupling into alignment with each of the upper and lower working rolls and also by means for moving the couplings toward or away from the upper and lower working rolls on a lower backup roll to bring the couplings into or out of engagement with the working rolls respectively.

The apparatus of this invention is further characterized in that the upper and lower couplings for the upper and lower working rolls are held in their horizontal position by the respective holding means which can be moved vertically of the apparatus at the same time in a given ratio for example of 3:1 relative to each other, and in that the couplings can be supported by the holding means with either one of the couplings axially retracted from the other coupling by a suitable distance so that the couplings can be fitted to the upper and lower working rolls with great ease.

When the drive assembly is to be connected to a working roll for example of a rolling mill for the replacement of the roll according to this invention, the coupling connected to the spindle by a universal joint is held by the holding means in its horizontal position in alignment with the driven shaft. The coupling in this state is then moved into fitting engagement with the driven shaft in its fixed position, so that the coupling can be jointed to the driven shaft without entailing any impact while being prevented from lowering out of alignment with the driven shaft. Thus no damage will be caused to the machine. Additionally, the apparatus facilitates the adjustment of the center-to-center spacing between the two couplings to the corresponding spacing between new rolls, namely adjustment of the level of the couplings, and elimination of an angular displacement between the two fitting portions. Thus the present apparatus ensures automatic and efficient replacement of rolls within a greatly reduced time period. This serves to remarkably improve the operation efficiency of the rolling mill.

Further when the drive assembly is to be disconnected from the driven shaft by being retracted therefrom in alignment therewith, the holders of the holding means hold the coupling in engagement with a peripheral groove formed in the coupling. This engagement permits the holding means to retract and remove the coupling from the driven shaft without involving any slippage between the holders and the coupling even when the fitting force acting between the coupling and the driven shaft is very great.

During the rotation of the driven shaft, the holding means for holding the coupling are completely out of engagement with the coupling, with the resulting advantage that the power transmission from the drive assembly to the driven shaft does not involve a great power loss.

The holding means according to this invention are vertically movably supported by posts provided at the front end of the frame which is slidable toward or away from the driven shaft along the axis of the shaft. The holding means are adapted to hold the opposite sides of the coupling to support the coupling in its horizontal position in alignment with the axis of the driven shaft. With the holding means thus holding the coupling, the frame slides toward or away from the driven shaft to fit the coupling to or release the same from the driven shaft. When the holding means hold the coupling on its opposite sides, reaction against the holding force is delivered from the holding means to the posts. Additionally, when the frame is moved forward or rearward to join the coupling to or release the same from the driven shaft, frictional resistance acts at the fitting joint between the coupling and the driven shaft. The resulting reaction similarly acts on the posts. Since little or no clearance is usually provided at the joint between the coupling and the driven shaft so as to eliminate oscillation in the direction of rotation of the roll, the frictional resistance subjects the posts to considerably great reaction.

These reactions act on the posts at right angles to the axes of the posts, rendering the posts very liable to flexure. Accordingly, there arises the necessity of using posts of sufficiently large diameter and imparting increased strength to their fixed portions, but this would render the overall apparatus too large to accommodate within a limited space, giving rise to an increase in the floor area required of the plant, hence uneconomical.

Accordingly, another object of this invention is to provide a compact apparatus in which the posts are prevented from flexure and which is so adapted that the reactions acting on the posts through the holding means are partly withstood by the frame supporting the posts.

Other objects and features of this invention will become more apparent from the following description.

DESCRIPTION OF THE PREFERRED EMBODIMENTS

With reference to the drawings, an embodiment of this invention will be described below as it is adapted for use with drive assemblies of a rolling mill.

Figure 1:
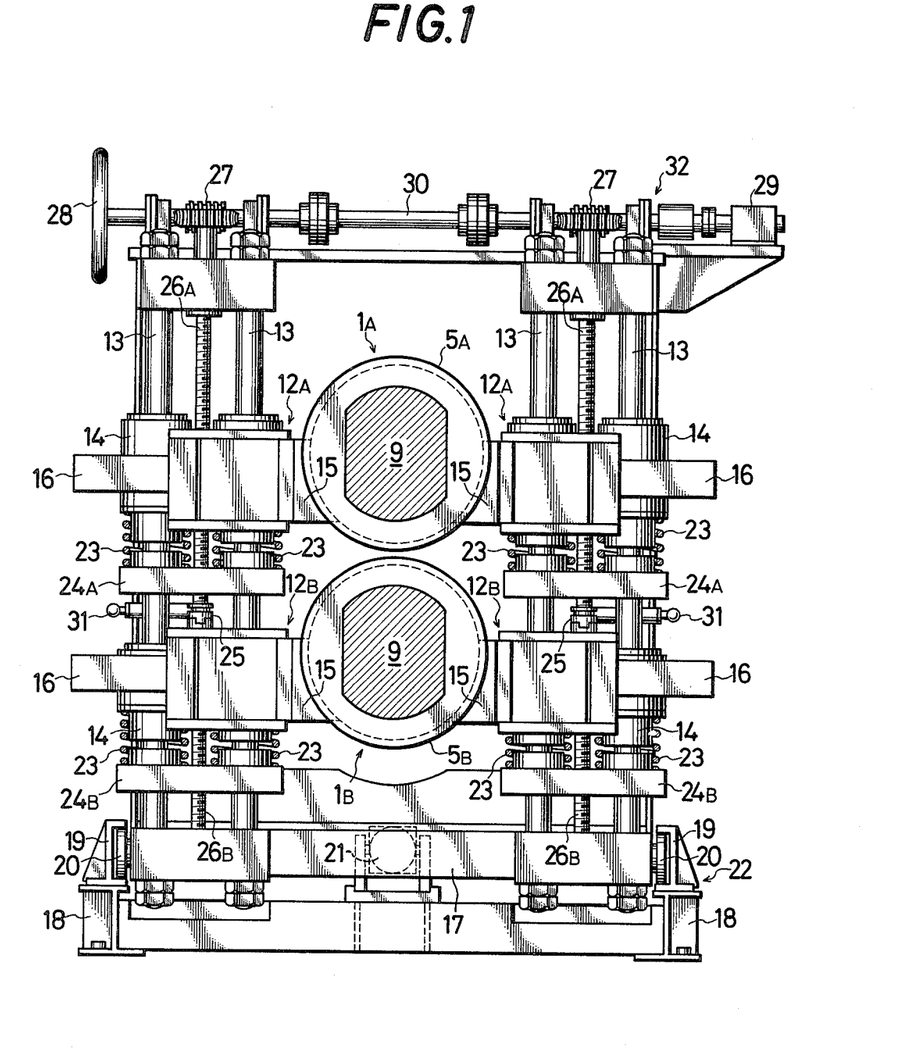
FIG. 1 is a front view showing an embodiment of the invention.
Figure 3:
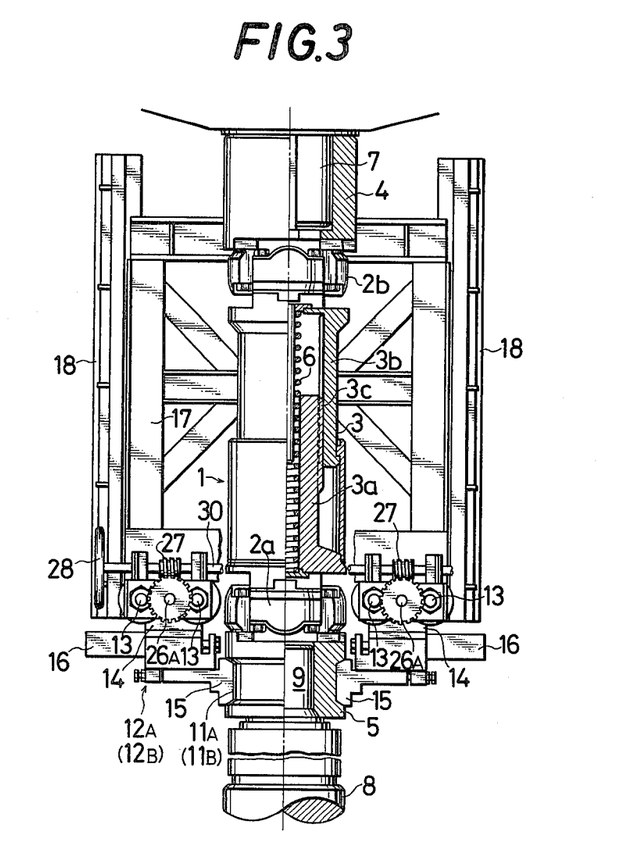
FIG. 3 is a plan view of the apparatus of FIG. 1 with one half of a drive assembly shown in longitudinal section.

FIG. 3 shows a drive assembly 1 including a spindle 3 composed of two tubular members 3a, 3b which are splined to each other as at 3c to render the spindle axially extensible and collapsible. The spindle 3 has one end connected to a drive fitting yoke 4 by a universal joint 2b and the other end connected by another universal joint 2a to a coupling member 5. Accommodated in the spindle 3 is a spring 6 biasing the tubular members 3a, 3b away from each other to axially extend the spindle 3. The fitting yoke 4 is fitted to a drive shaft 7 in a fixed position, while the coupling member 5 is fitted to the neck 9 of a working roll 8 serving as a driven shaft to drive the roll 8. As seen in FIG. 1, the coupling member 5 is formed with a bore of oval rectangular cross section in which the roll neck 9 conforming to the shape of the bore is fitted.

Figure 2:
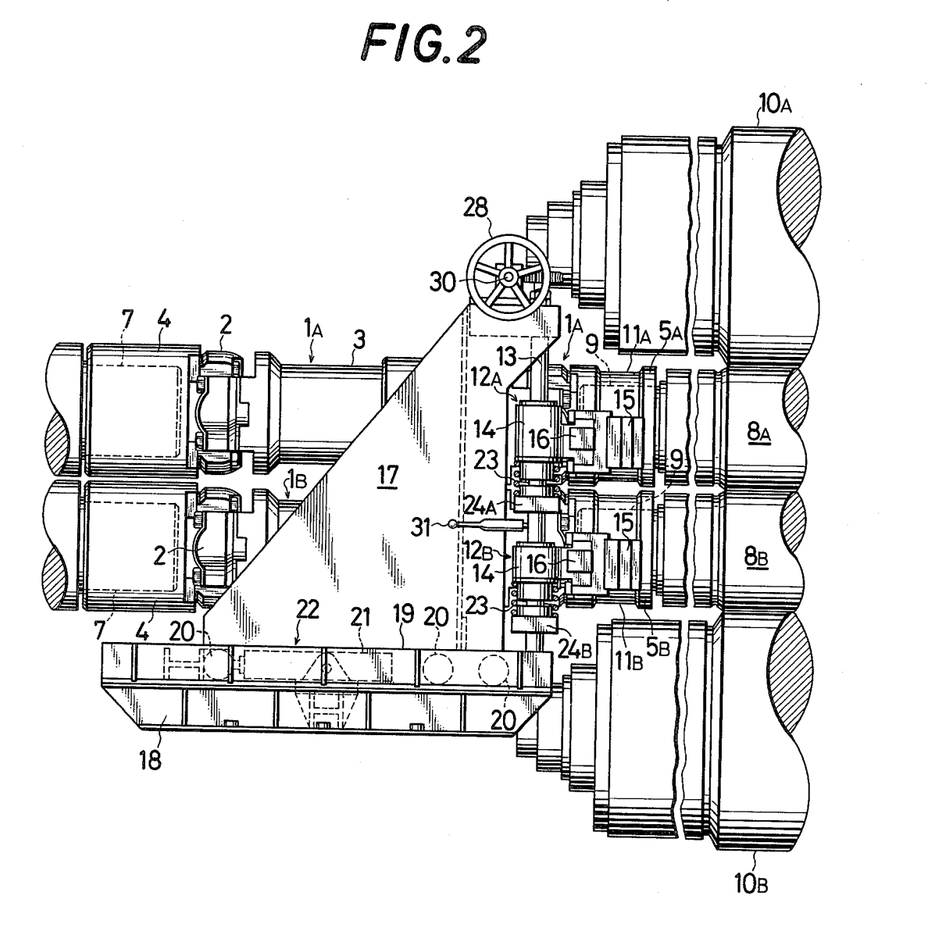
FIG. 2 is a side elevation of the apparatus of FIG. 1.

With a rolling mill as shown in FIGS. 1 and 2, an upper working roll 8A and a lower working roll 8B, supported by an upper backup roll 10A and a lower backup roll 10B, are driven by two drive means, namely by upper drive means 1A and lower drive means 1B respectively.

The upper and lower couplings 5A, 5B are formed, each in the peripheral surface thereof, with circumferential grooves 11A, 11B of suitable width. Two pairs of holding means 12A, 12B, disposed one pair above the other, are provided for the couplings 5A, 5B respectively. Each pair of the holding means 12A or 12B are movable sidewise toward or away from the corresponding coupling 5A or 5B to hold the coupling, supporting the coupling in its horizontal position in alignment with the corresponding working roll 8A or 8B. Each of the pair of holding means 12A (12B) arranged on the opposite sides of the coupling 5A (5B) comprises a support member 14 vertically slidably supported by a suitable number of upright posts 13, a holder 15 supported on the support member 14 and slidable sidewise toward the coupling 5A (5B), and hydraulic means 16 for slidingly drive the holder 15 to engage the end of the holder 15 into the circumferential groove 11A (11B). The pair of the holders 15 are thus adapted to hold the corresponding coupling 5A (5B) in its horizontal position.

The upright posts 13 are fixed to a frame 17 which is slidably supported on rails 19 by rollers 20. The rails 19 are secured to a base 18 and extend in parallel to the extensions of the axes of the driven shafts 9. The frame 17 on the base 18 is movable by hydraulic means 21 toward or away from the upper and lower working rolls 8A, 8B axially thereof. The above elements constitute sliding means 22.

The sliding means 22 is actuated with the upper and lower pairs of the holding means 12A, 12B holding the upper and lower coupling members 5A, 5B in their horizontal position, retracting the frame 17 from the upper and lower working rolls 8A, 8B, whereby the couplings 5A, 5B can be released from the roll necks 9. During this operation, the drive means 1A, 1B have their spindles 3 telescopically collapsed against the action of the springs 6. When new upper and lower working rolls 8A, 8B are placed on a lower backup roll 10B, the sliding means 22 is actuated to advance the frame 17 toward the working rolls 8A, 8B, thereby fitting the upper and lower couplings 5A, 5B to the corresponding roll necks 9. The holders 15 of the holding means 12A, 12B are thereafter disengaged from the circumferential grooves 11A, 11B of the couplings 5A, 5B, whereby the new working rolls 8A, 8B are made ready for the rolling operation.

As already stated, the replacement of the upper and lower working rolls produces alterations in the levels of the these rolls with respect to the lower backup roll 10B in the foregoing relationship. According to this invention, the support members 14 of the upper and lower holding means 12A, 12B are elastically supported on screw nuts 24A, 24B with springs 23 interposed therebetween. Provided between the upper and lower screw nuts 24A, 24B are shifter couplings 25 each of which substantially connects an upright upper screw rod 26A to an upright lower screw rod 26B. The upper screw nut 24A and the lower screw nut 24B are mounted on the upper screw rod 26A and the lower screw rod 26B respectively in screw-thread engagement with each other. The pairs of the upper and lower screw rods 26A, 26B are rotatably supported on the frame 17 in their upright position. The ratio of the screw pitch of the upper rod to that of the lower rod is for example 3:1. The pairs of the screw rods are operatively connected by worm-and-wheel means 27 to an adjusting bar 30 provided at the top of the frame 17 and rotatable by a handle 28 or motor 29. The rotation of the bar 30 therefore vertically moves the upper and lower holding means 12A, 12B at the same time in a predetermined ratio (e.g., 3:1) relative to each other. This assembly provides means 32 for adjusting the spacing between the upper and lower couplings. Additionally, each of the upper and lower screw rods 26A, 26B is rotatable independently of the other for the adjustment of the spacing through the action of the lever 31 of the shifter coupling 25 substantially connecting the upper and lower rods together.

Thus the simultaneous vertical movement of the upper and lower holding means 12A, 12B in a predetermined ratio effected by rotating the handle 28 or by the operation of the motor 29 brings the couplings into alignment with new upper and lower working rolls 8A, 8B while supporting the couplings in their horizontal position, whereby the couplings 5A, 5B can be fitted to the new upper and lower working rolls 8A, 8B with extreme ease.

Figure 4:
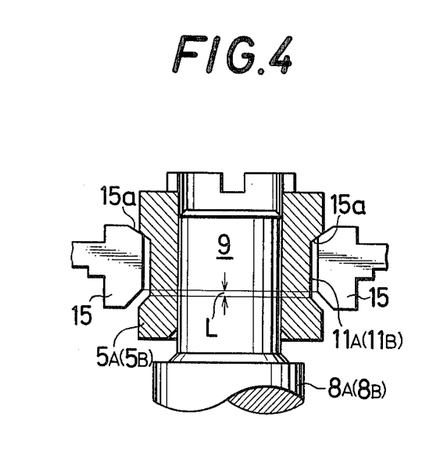
FIG. 4 is a plan view showing the holders of holding means when they come into holding engagement with a coupling member which is shown in section.
Figure 5:
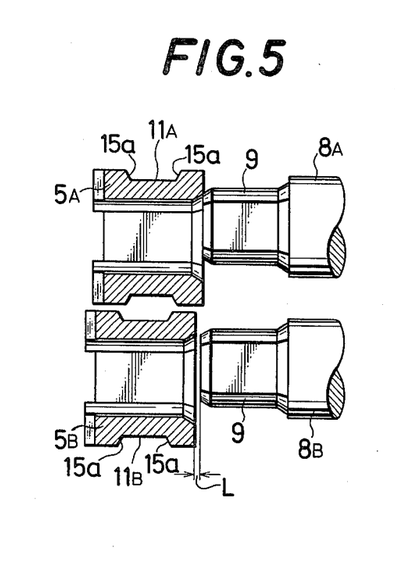
FIG. 5 is a side elevation showing the relationship between two couplings while they are being fitted to drive shafts as held by holding means (not shown), the coupling members being shown in cross section.

To meet the situation in which there is a relative angular displacement between the couplings 5A, 5B and the working rolls 8A, 8B to be fitted thereto, the circumferential grooved portions 11A, 11B and the holders 15 are formed with slanting surfaces 15a for permitting the former to be positioned as displaced from the other relative to each other as seen in FIGS. 4 and 5, such that either one of the upper and lower couplings 5A, 5B held by the holding means 12A, 12B will be positioned axially away from the roll necks 9 of the working rolls 8A, 8B by a suitable distance L.

While the couplings 5A, 5B are held by the holding means in their horizontal position in alignment with new upper and lower working rolls 8A, 8B, the couplings will be fitted to the roll neck 9, for example, with the lower coupling 5B retracted from the upper coupling 5A by a distance L. In this case, the relative angular displacement between the upper coupling 5A and the upper working roll 8A is first eliminated as by rotating the upper drive assembly 1A by degrees, and the roll neck 9 of the upper working roll 8A is fitted to the upper coupling 5A to an extent smaller than the dimension L. Subsequently, the lower coupling 5B is brought into agreement with the lower working roll 8B with respect to the angular position by rotating the lower drive assembly 1B by degrees. The frame 17 is then slidingly driven toward the working rolls and thereafter stopped when the upper coupling 5A completely fits to the roll neck 9 of the upper working roll 8A, whereupon the couplings are released from the upper and lower holding means 12A, 12B. Consequently, the spring 6 housed in the lower drive assembly 1B forces out the lower coupling 5B into complete fitting engagement with the roll neck 9 of the lower working roll 8B.

The spacing and the levels of the upper and lower couplings 5A, 5B are adjusted by the adjusting means 32 in conformity with the altered spacing and levels of new working rolls 8A, 8B. If upper and lower fitting portions are still out of alignment despite the adjustment, the axial relative displacement between the couplings is useful in ensuring alignment. When the parts are to be fitted together, one coupling 5A first comes into contact with the end of the working roll 8A and is self-aligned therewith by the cooperation of the chamfered bore end and roll end, and the other coupling 5B thereafter starts to fit to the other working roll 8B and comes into complete fitting engagement therewith similarly through self-alignment. The springs 23 elastically supporting the holding means 12A, 12B on the screw nuts 24A, 24B assist in such alignment, also eliminating the possible impact.

Figure 6:
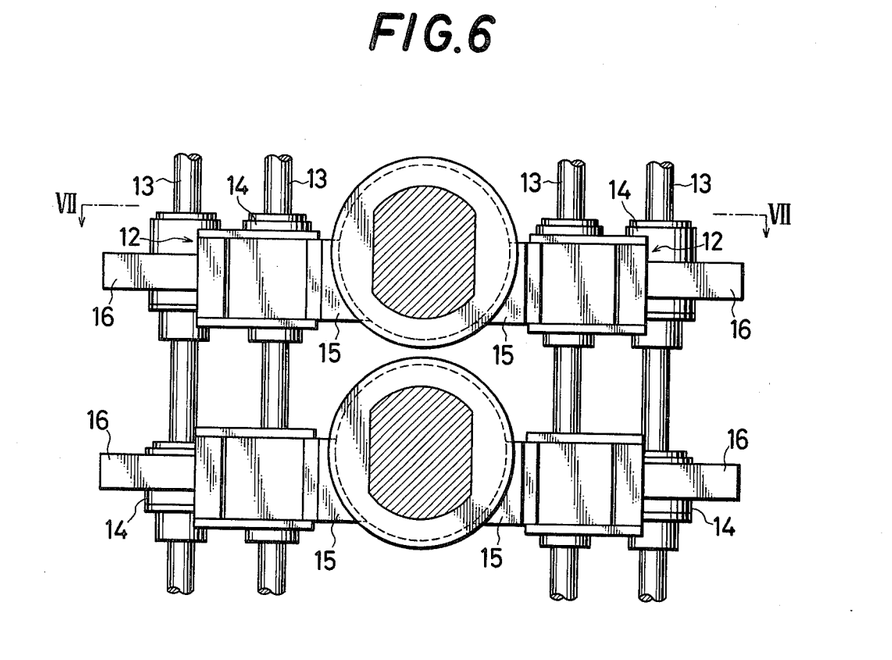
FIG. 6 is a front view showing the relationship between the holding means and posts therefor.
Figure 7:
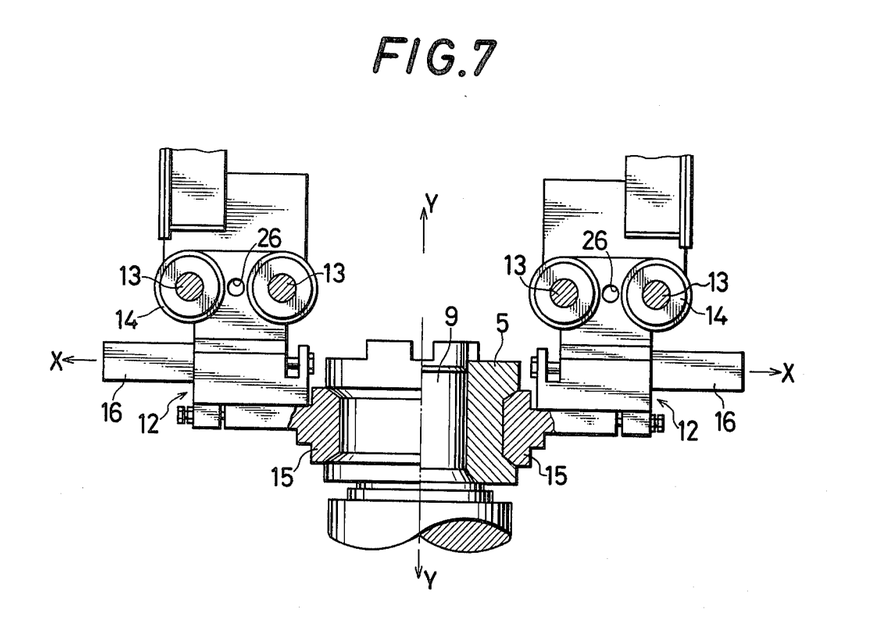
FIG. 7 is a plan view partly in section taken along the line VII—VII in FIG. 6.

FIGS. 6 and 7 show the holding means. Since the upper and lower holding means 12A, 12B are of identical construction, the holding means will be referred to by a reference numeral 12 in FIG. 6 et seq. Each of the holding means 12 includes the support member 14 vertically slidably supported on the upright posts 13 on the frame 17. Hydraulic or pneumatic means 16 drive the holders 15 on the pair of holding means 12, causing the holders 15 to hold the coupling 5 on its opposite sides. The holding action of the holders 15 subjects the posts 13 to a reaction in the direction of arrow X. Furthermore the engagement of the holders 15 in the circumferential groove 11 in the coupling 5 subjects the posts 13 to a reaction in the direction of arrow Y. Additionally, the engagement of the coupling 5 to the roll neck 9 or the disengagement of the same therefrom similarly exerts a reaction in the direction of arrow Y on the posts 13. Consequently, the posts 13 are subjected to the combination of the reactions in the directions of arrows X and Y and are liable to flex in the direction of the combined reaction.

Figure 8:
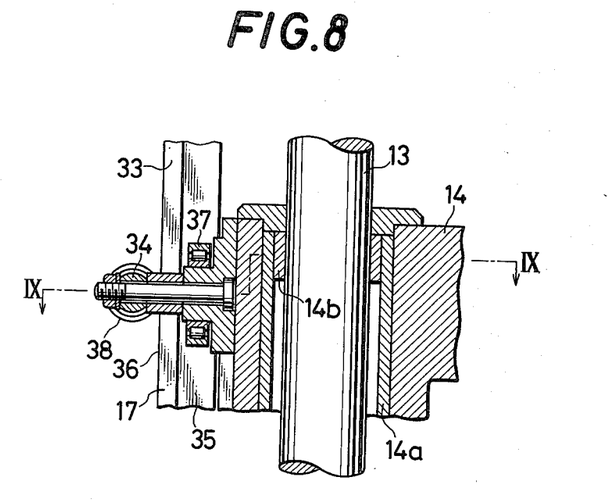
FIG. 8 is a side elevation partly in vertical section showing a principal part of another embodiment of this invention, namely a support for the holding means.
Figure 9:
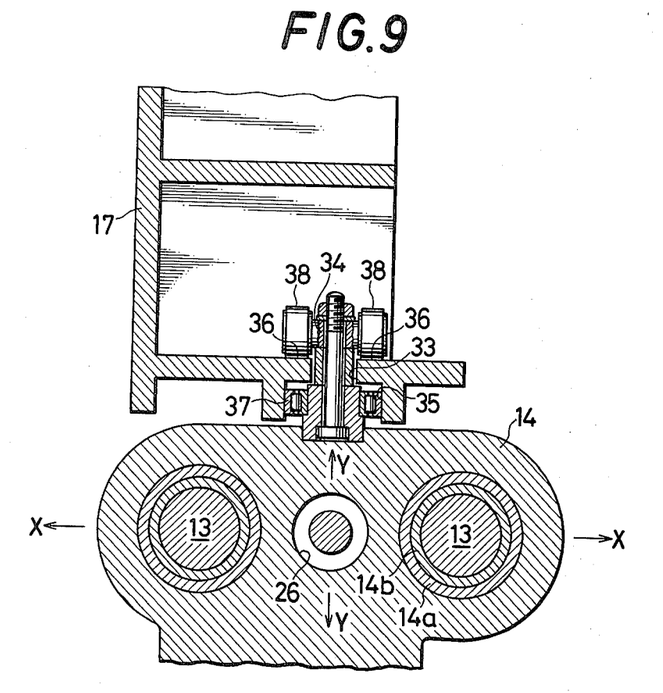
FIG. 9 is a plan view in cross section taken along the line IX—IX in FIG. 8.
Figure 10:
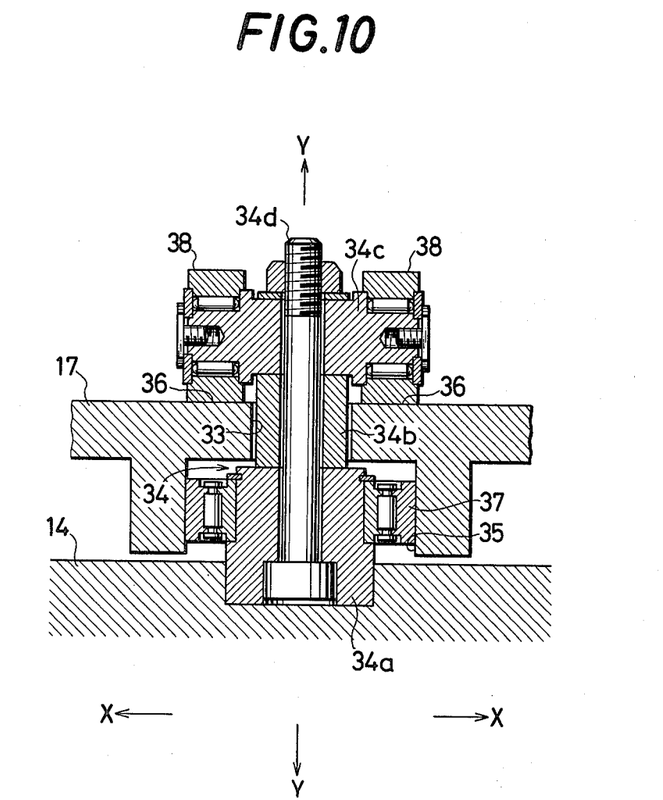
FIG. 10 is a plan view in cross section showing part of FIG. 9 on an enlarged scale.

FIGS. 8 to 10 show means for assuring the strength of the posts 13. The support member 14 having an unillustrated holder is vertically slidably supported by the upright posts 13 on the frame 17 with bushes 14a, 14b provided between the support member 14 and the posts. The support member 14 is vertically slidable on an unillustrated screw rod (i.e., screw rod 26A or 26B in FIGS. 1 and 2) extending through a threaded bore 26 in the support member 14.

The support member 14 is provided on its rear side with a T-shaped rod 34 projecting through a slot 33 formed in the frame 17 and extending vertically. The frame 17 is provided with a channel 35 extending in parallel to the posts 13 to guide the holding means and with planar paths 36 on the rear side of the channel 35 and extending on the opposite sides of the slot 33. In rolling contact with the channel 35, the rod 34 carries a bearing 37 for receiving the reaction in the direction of arrow X. The rod 34 is further provided on the opposite ends of its lateral bar with a pair of bearings 38 in rolling contact with the paths 36 for receiving the reaction in the direction of arrow Y.

The T-shaped rod 34 is shown in greater detail in FIG. 10 and is in the form of an assembly comprising a base portion 34a fixed to the support member 14, an intermediate tubular portion 34b, a lateral bar portion 34c at right angles to the tubular portion, and a bolt 34d extending through these portions. The bolt 34d and a nut unite these portions. The bearing 37 is a roller bearing fitting around the base portion 34a and rollable on the channel 35, while the pair of the bearings 38 are roller bearings of the cam follower type mounted on the opposite ends of the bar portion 34c and rollable on the paths 36. The rod 34 and the bearings 35, 36 are not limited to these illustrated examples, but some other suitable rod and bearings are also usable.

As already stated, the engagement of the holders with the coupling member of the drive assembly produces reactions acting in the directions of arrows X and Y. The engagement of the coupling with the roll neck as well as the disengagement of the same therefrom similarly produces a reaction acting in the direction of Y as illustrated in FIGS. 6 and 7. These reactions, when acting on the posts 13 by way of the support member 14 of the holding means, also act on the frame 17 at the same time through the rod 34 and the bearings 37, 38. Thus, the reactions act partly on the posts 13 and partly on the frame 17. The support assembly described therefore limits the amount of flexure of the posts 13 to a minimum extent despite its simple construction without the necessity of using posts of increased diameter and greater strength. This serves to render the overall apparatus compact.

Further because the load of the reaction is delivered to the frame 17 by way of the rolling bearings 37, 38, the holding means is smoothly movable up and down free of any trouble. The roller bearings 38 of the cam follower type provided on the opposite sides of the lateral bar portion 34c of the T-shaped rod 34 serve to support the holding means with much greater strength than the conventional cam follower type bearing which is supported on one side only. The support assembly described also renders the rod 34 free of any distortion to be otherwise caused by the reaction in the direction Y, thus withstanding the reaction with high stability.

We claim:

1. An apparatus for releasing a drive assembly from a driven shaft and connecting the same thereto, the drive assembly including a telescopic spindle and a sleeve-shaped coupling member connected to the spindle by a universal joint and releasable from and connectible to the driven shaft by the apparatus, comprising:

a frame supported on a base and slidable toward or away from the driven shaft in parallel to an extension of the axis of the driven shaft, means for slidingly driving the frame, a pair of holding means vertically slidably supportted by the frame and arranged on the opposite sides of the coupling member of the drive assembly respectively, the holding means having holders respectively for holding the opposite sides of the coupling member to support the coupling member in its horizontal position in alignment with the driven shaft, each of the holding means including drive means for moving the holder toward or away from the coupling means in a horizontal direction, and control assemblies mounted on the frame for vertically slidingly moving the holding means.

2. An apparatus as defined in claim 1 wherein each of the holding means is vertically slidably supported by at least two posts secured to the front end of the frame.

3. An apparatus as defined in claim 2 wherein each of the holding means includes a support member vertically slidably mounted on the posts, the holder being horizontally slidably supported by the support member and movable toward or away from the coupling member in a direction at right angles to the axis of the coupling member.

4. An apparatus as defined in claim 1 wherein the frame is slidably supported by rollers rollable on rails on the base.

5. An apparatus as defined in claim 1 wherein each of the control assemblies comprises a screw rod mounted upright on the front end of the frame and in screw-thread engagement with the holding means and means for rotating the screw rod.

6. An apparatus for releasing two drive assemblies disposed one above the other from similarly disposed driven shafts and connecting the assemblies to the driven shafts, each of the drive assemblies including a telescopic spindle and a sleeve-shaped coupling member connected to the spindle by a universal joint and releasable from and connectable to corresponding one of the driven shafts by the apparatus, comprising:

a frame supported on a base and slidable toward or away from the driven shafts in parallel to extensions of the axes of the driven shafts, means for slidingly driving the frame, two pairs of holding means disposed one pair above the other, each pair of the holding means being vertically slidably supported by the frame and arranged on the opposite sides of the coupling member of each of the drive assemblies, each pair of the holding means having holders respectively for holding the opposite sides of the coupling member to support the coupling member in its horizontal position in alignment with the driven shaft, each of the holding means including drive means for moving the holder toward or away from the coupling means in a horizontal direction, and control assemblies mounted on the frame for vertically slidingly moving the holding means.

7. An apparatus as defined in claim 6 wherein the frame is slidably supported by rollers rollable on rails on the base.

8. An apparatus as defined in claim 6 wherein each of the holding means is vertically slidably supported by at least two posts secured to the front end of the frame.

9. An apparatus as defined in claim 8 wherein each of the holding means includes a support member vertically slidably mounted on the posts, the holder being horizontally slidably supported by the support member and movable toward or away from the coupling member in a direction at right angles to the axis of the coupling member.

10. An apparatus as defined in claim 9 further comprising:

a T-shaped rod projecting from the rear side of the support member of each of the holding means, a roller bearing mounted on a portion in parallel to the driven shaft of the T-shaped rod, the bearing being rollable on a channel-shaped guide portion extending vertically on the front surface of the frame to cause the frame to receive part of a reaction acting on the posts at right angles to the axis of the driven shaft when the holders hold the coupling member, and two roller bearings mounted on the opposite ends of a bar portion of the T-shaped rod, the bar portion being at right angles to the axis of the driven shaft, the two roller bearings being rollable on guide portions extending vertically on the frame to cause part of the frame to receive part of a reaction acting on the posts in the axial direction of the driven shaft when the holders hold the coupling member and when the coupling member is released from or connected to the driven shaft.

11. An apparatus as defined in claim 10 wherein the T-shaped rod extends through a vertical slot formed in the frame with the bar portion thereof positioned on the rear side of the frame, and the guide portions in rolling contact with the roller bearings on the opposite ends of the bar portion are provided on the rear surface of the frame.

12. An apparatus as defined in claim 10 wherein the two bearings mounted on the bar portion of the T-shaped rod are roller bearings of the cam follower type.

13. An apparatus as defined in claim 6 wherein the holders of each pair of the holding means are engageable in a circumferential groove formed in each of the upper and lower coupling members and defined by slanting surfaces, one of the coupling members being positionable as axially retracted from the other coupling member by a suitable distance when the holders are engaged in the grooves respectively.

14. An apparatus as defined in claim 6 wherein the control assemblies are provided on the opposite sides of the front end of the frame each in its upright position, each of the control assemblies comprising a screw rod in screw-thread engagement with a corresponding portion of the holding means and means for rotating the screw rod.

15. An apparatus as defined in claim 14 wherein the screw rod comprises an upper half portion and a lower half portion having different screw pitches in a predetermined ratio and connected together by a shifter coupling.

16. An apparatus as defined in claim 14 wherein each of the holding means includes a screw nut in screw-thread engagement with the corresponding screw rod, and a spring is interposed between the nut and the support member for elastically supporting the holding means vertically movably.

* * * * *